Jan. 7, 1947.　　　D. J. CARR ET AL　　　2,414,017
COLLAPSIBLE GOLF BAG CARRIER
Filed Sept. 13, 1945
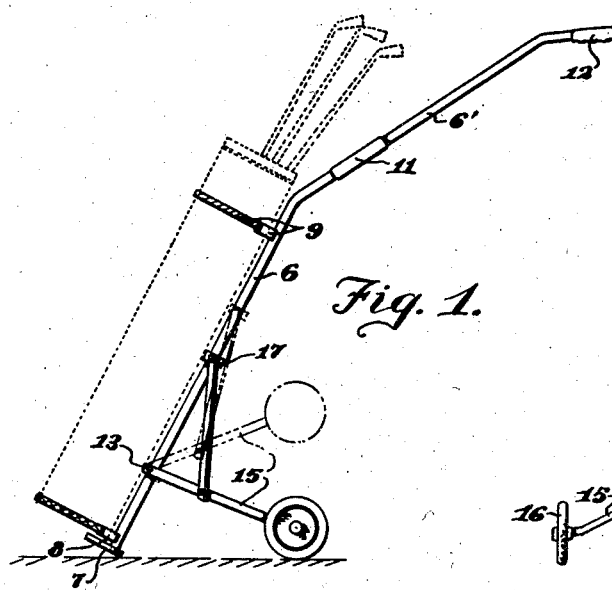
*Fig. 1.*
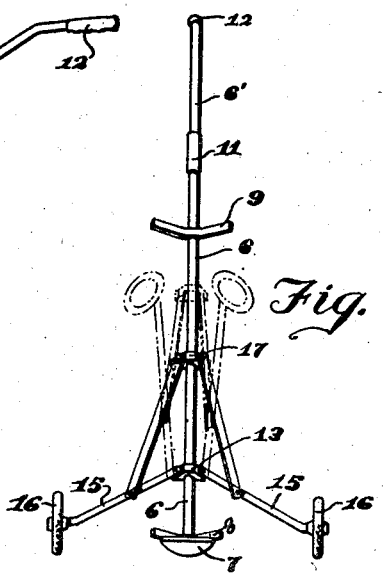
*Fig. 2.*
*Fig. 3.*
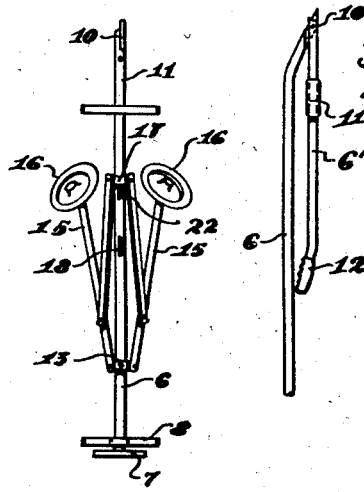
*Fig. 4.*
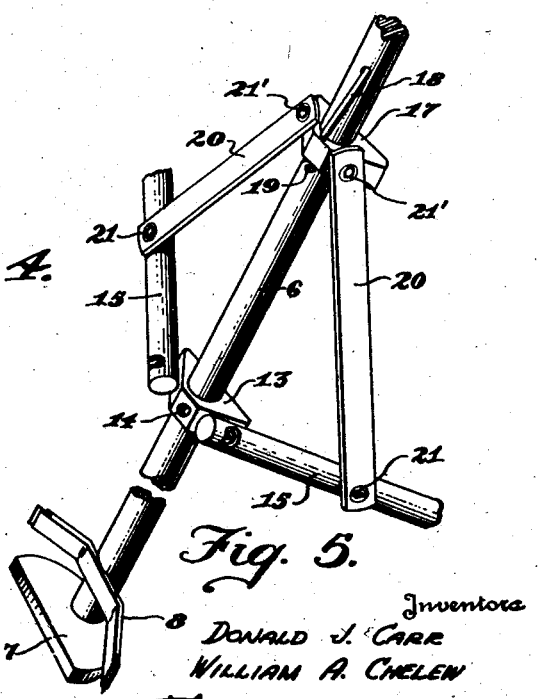
*Fig. 5.*
Inventors
Donald J. Carr
William A. Chelew Patented Jan. 7, 1947

2,414,017

UNITED STATES PATENT OFFICE 2,414,017

COLLAPSIBLE GOLF BAG CARRIER

Donald J. Carr and William A. Chelew,
Los Angeles, Calif.

Application September 13, 1945, Serial No. 615,933

6 Claims. (Cl. 280—38)

Our invention relates to collapsible golf bag carriers of the type used by golfers for carrying the golf bag and clubs over the golf course as they play the game.

Among the salient objects of our invention are: to provide a carrier upon which the golf bag can be secured in position and easily moved from place to place and which can be left standing with the golf bag in upright position so that the clubs therein are accessible; to provide a carrier which is collapsible with the golf bag in place therein, whereby the carrier, golf bag and clubs all in the bag can be placed in an automobile and will take up a minimum of space; to provide a wheeled carrier with the wheels mounted on the outer ends of diverging members, pivotally connected at their adjacent ends to a common backbone, whereby as the outer ends of said diverging members and the wheels thereon are raised they move upwardly and inwardly toward and close to said backbone in collapsed position; to provide in connection with diverging wheel-carrying members, a backbone or median member which is jointed and foldable from a handle-forming member to collapsed position; and, in general, to provide a simple, practical and economical collapsible golf bag carrier of the character referred to and which can be collapsed without removing the bag from the carrier proper.

In order to fully describe our invention, we have shown on the accompanying sheet of drawings one practical embodiment thereof, which we will now describe.

Figure 1 is a side elevation of a collapsible golf bag carrier, embodying our invention, with a golf bag indicated in light broken lines, and the carrier wheels partially raised in light broken lines;

Figure 2 is a front elevation of the carrier, showing the wheels raised in folded form or position;

Figure 3 is a front elevation of the carrier in collapsed position;

Figure 4 is a fragmentary view of the handle portion, folded down as when collapsed;

Figure 5 is an enlarged fragmentary view in perspective, showing certain details of construction and arrangement.

Referring now in detail to the drawing, the invention as here shown includes a main member or backbone 6, provided at its lower end with a foot or support 7 for the lower end of a golf bag, with strap holder and strap 8, for securing the lower end of the bag to the backbone. At its upper end, said backbone member is provided with strap holder and strap 9 for securing the bag to the member. This means for securing the golf bag to the backbone member 6 can be of any suitable construction. Said backbone member 6, is hinged at 10, so that it can be folded down into the position shown in Fig. 4, when the carrier is collapsed into its smallest compass, with a slide sleeve 11 to be moved down over the joint for holding said handle portion 6' in operative position. A hand grip 12 is shown on the outer end of said handle portion.

Mounted on said backbone 6, is a pivot block 13, of angular form, as indicated, and secured in adjusted position by means of a set screw 14. Pivotally connected to the angle sides of said block 13 are two angularly positioned leg members 15, 15, having at their outer ends carrier wheels 16, 16, as shown, said wheels being positioned rearwardly of the backbone 6, when in operative position, as indicated.

Also mounted on said backbone member 6, is another angle block 17, adapted to slide up and down thereon, with a spring lip or latch 18 for holding it in its down position, resting against a stop, here shown as a screw head 19. In order to raise said block 17, it is only necessary to depress the down end of said lip or latch, into a recess provided therefor in the backbone member, as will be understood, whereupon said pivot block 17 can be moved upwardly on said backbone member. Two brace members, 20, 20, are shown pivotally connected at their lower ends, as at 21, 21, to the members 15, 15, and at their upper ends, said brace members are pivotally connected to the angle sides of said block 17, as clearly shown, at 21' so that as said block 17 is released and moved upwardly on said backbone, said brace members pull the leg members 15, 15, upwardly with their wheels, into the positions indicated in Figs. 2 and 3.

In order to hold said pivot block 17, and said leg members, wheels and brace members in this raised or collapsed position, a second spring latch 22 can be provided in the upper position on said backbone member 6, as indicated in Fig. 3. This or other means for holding the members in the folded or collapsed positions can be used.

Thus it will be seen that we have here a collapsible golf bag holder and carrier which can be easily and quickly opened out for use from the folded or collapsed position shown in Fig. 3, to the operating condition, as shown in Fig. 1. It will also be understood that it is not necessary to remove the bag from the carrier in order to collapse the same. When collapsed, as indicated in Figs. 3 and 4, with the handle portion 6' folded down, in the rear of the bag, said carrier, bag and all can be conveniently put into an automobile and requires comparatively small space.

We do not limit the invention to the details of construction shown and described for explanatory purposes, except as we may be limited by the hereto appended claims.

We claim:

1. A collapsible golf bag carrier including a central backbone member having means for securing a golf bag thereto, lengthwise thereof, and having its upper end formed into a handle, a pair of diverging leg members pivotally connected to said backbone member and diverging therefrom rearwardly and each having a carrier wheel on its outer end, brace members pivotally connected at their lower ends to said diverging members intermediate their ends and at their upper ends pivotally and slidably connected with said backbone member to slide up and down thereon, whereby to collapse with said diverging members as said diverging members are raised upwardly and inwardly toward said backbone member.

2. In a golf bag carrier, a backbone having means for attaching a golf bag thereto lengthwise thereof, a pair of diverging leg members pivotally connected to said backbone member at their attached ends and having carrier wheels mounted on their outer ends, rearwardly of said backbone member, brace members pivotally connected at their lower ends to said diverging members and at their upper ends pivotally connected to said backbone member and movable upwardly and downwardly thereon, whereby said diverging members and said brace members can be raised upwardly and inwardly to said backbone member in collapsed condition.

3. A collapsible golf bag carrier including a backbone member provided at its lower end with a bag support, and with strap means for securing a bag to said backbone lengthwise thereof, a pivot block on said backbone, two diverging leg members pivotally connected to said pivot block at their attached ends and provided with carrier wheels at their outer, free ends, a second pivot block slidably mounted on said backbone, above said first pivot block, brace members pivotally connected at their lower ends to said diverging leg members and at their upper ends to said second pivot block to move therewith, and latch means on said backbone for holding said second pivot block in different positions of adjustment from operative position to collapsed condition.

4. A collapsible carrier for golf bags and the like, a backbone member, means thereon for supporting the thing to be carried lengthwise thereof, a pivot block mounted on said backbone member and having its opposite sides at diverging angles, two leg members pivotally connected to said opposite sides and diverging therefrom and having carrier wheels at their outer ends, a second pivot block slidably mounted on said backbone above said first pivot block and having its opposite sides at diverging angles, brace members pivotally connected on said opposite sides and at their lower ends pivotally connected to said leg members, whereby as said second pivot block is moved up and down on said backbone, said leg members move upwardly and downwardly in the planes of said opposite sides of said pivot block and to and from said backbone member, and means for holding said leg members and said brace members in operating positions and in collapsed positions.

5. In a collapsible carrier apparatus of the character referred to, a backbone member, two pivot blocks secured thereon, one above the other, the upper one being slidable on said backbone, both of said pivot blocks having their opposite sides at diverging angles, in diverging planes, two leg members pivotally connected at their corresponding ends to said pivot block, on said diverging sides, whereby said leg members extend in opposite diverging directions rearwardly of said backbone, carrier wheels on the outer ends of said leg members, brace members pivotally connected with the upper pivot block on its opposite diverging sides and at their lower ends pivotally connected with said leg members, intermediate their ends, and latch means on said backbone for holding said slidable pivot block in adjusted position.

6. A collapsible golf bag carrier including a main backbone member having an extended handle portion, two rearwardly diverging wheel-supporting legs connected pivotally at their converging ends to said backbone member, with wheels on their free rearwardly extending ends, a pair of pivoted brace members connected at their lower ends to said wheel-supporting legs, intermediate their ends, and at their upper ends pivotally and slidably connected with said backbone member, whereby said legs and said brace members can be folded upwardly and inwardly together around said backbone, substantially in the manner indicated.

DONALD J. CARR.
WILLIAM A. CHELEW.